(12) United States Patent
Forbes

(10) Patent No.: US 7,540,458 B2
(45) Date of Patent: Jun. 2, 2009

(54) MOUNTING ASSEMBLY AND INSTALLATION

(75) Inventor: Carol S. Forbes, Carterville, IL (US)

(73) Assignee: A Touch of Class, LLC, Carterville, IL (US)

(*) Notice: Subject to any disclaimer, the term of this patent is extended or adjusted under 35 U.S.C. 154(b) by 365 days.

(21) Appl. No.: 11/414,457

(22) Filed: Apr. 28, 2006

(65) Prior Publication Data

US 2007/0252062 A1 Nov. 1, 2007

Related U.S. Application Data

(60) Provisional application No. 60/676,696, filed on Apr. 29, 2005.

(51) Int. Cl.
*A47H 1/16* (2006.01)
(52) U.S. Cl. ............... 248/303; 248/217.1; 248/217.3; 248/218.4
(58) Field of Classification Search ............... 248/303, 248/304, 216.1, 216.4, 217.1, 217.3, 218.1, 248/218.2, 218.3, 222.11; 411/450, 541.2, 411/485, 499; 160/349.1, 349.2
See application file for complete search history.

(56) References Cited

U.S. PATENT DOCUMENTS

| | | | |
|---|---|---|---|
| 229,873 A | 7/1880 | Day | |
| 762,594 A | 6/1904 | Michaels | |
| 806,141 A | 12/1905 | Henson | |
| 839,729 A | 12/1906 | Chance | |
| 1,030,205 A | 6/1912 | Peplowski | |
| 1,665,785 A | 4/1928 | Illch | |
| 1,842,786 A | 1/1932 | Kirsch | |
| 2,265,701 A * | 12/1941 | Richards | 248/491 |
| 2,559,057 A * | 7/1951 | Williams | 248/490 |
| 3,401,909 A | 9/1968 | Kalahar | |
| 3,954,243 A | 5/1976 | Sharp et al. | |
| 3,977,643 A | 8/1976 | Staley | |
| 3,991,963 A | 11/1976 | Solo | |
| D259,765 S * | 7/1981 | Kemper | D8/355 |
| 4,442,994 A | 4/1984 | Logsdon | |
| 4,509,713 A * | 4/1985 | Hogg | 248/546 |
| 4,619,430 A * | 10/1986 | Hogg | 248/467 |
| 5,149,037 A * | 9/1992 | Smith | 248/216.1 |
| 6,007,041 A * | 12/1999 | Law | 248/491 |
| 6,363,994 B1 | 4/2002 | Roberts et al. | |

(Continued)

OTHER PUBLICATIONS

Bracket Guide, Section 9, Graber trade brochure.

*Primary Examiner*—Ramon O Ramirez
(74) *Attorney, Agent, or Firm*—Senniger Powers LLP

(57) ABSTRACT

An mounting assembly for a wall or ceiling panel comprises a wire hook configured to be received in an opening extending through the panel from the front side to the back side thereof so that only a relatively short hook portion extends from the front side, while a relatively longer segment of the wire hook extends from the opening at the back side of the panel to engage the back side of the panel at a location spaced from the opening. The assembly also comprises an object holder for holding the object. The object holder has a mounting portion defining a bore for receiving the hook portion of the wire hook. The object holder has an arm extending from the mounting portion and defining a support surface for supporting the object. In one embodiment of the invention, the assembly is installed on a wall or ceiling panel.

24 Claims, 18 Drawing Sheets

U.S. PATENT DOCUMENTS

| | | |
|---|---|---|
| 6,371,427 B1 | 4/2002 | Johnson |
| 6,641,344 B2 | 11/2003 | Weiss |
| 2003/0183735 A1* | 10/2003 | Moerke et al. ......... 248/220.31 |
| 2005/0103961 A1* | 5/2005 | Swanstrom et al. |
| 2005/0218284 A1 | 10/2005 | kurrasch |
| 2005/0230577 A1* | 10/2005 | Chen .......................... 248/215 |

* cited by examiner

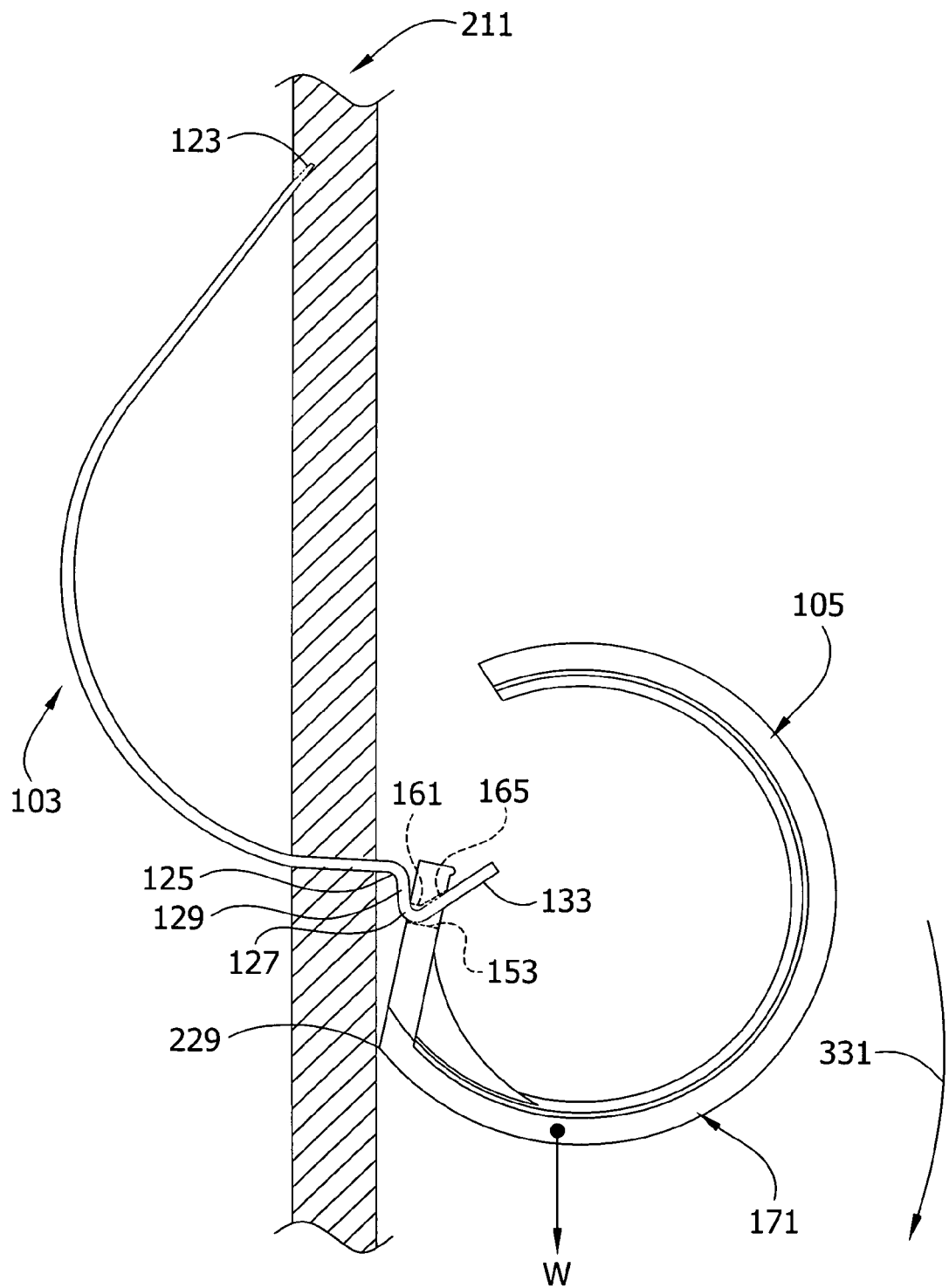

MOUNTING ASSEMBLY AND INSTALLATION

CROSS-REFERENCE TO RELATED APPLICATIONS

This application claims the benefit of U.S. Provisional Application No. 60/676,696, filed Apr. 29, 2005, entitled MOUNTING FIXTURE FOR MOUNTING FLEXIBLE ITEMS ON DRYWALL, herein incorporated by reference.

FIELD OF INVENTION

This invention relates to devices for hanging or mounting items on walls or ceilings, especially relatively large items such as curtains, drapes, swags and the like.

BACKGROUND

The art is replete with devices far hanging items on drywall, many of which result in the punching, drilling or otherwise providing a relatively large hole into the drywall. When the device is removed from the drywall, there remains a hole which requires substantial repair to the drywall.

For example, mounting fixtures for curtain rods and other large items often use wall anchors in which a plastic or metal sleeve is inserted into a pre-drilled hole through the drywall. The sleeve expands when a screw is screwed into the hole. The part of the sleeve that has penetrated the back side of the drywall expands the most, thereby supporting the fixture from the back side of the drywall and making it more difficult for the anchor to be pulled out of the drywall. Another option for mounting large fixtures is to use a toggle bolt, which involves making a hole in the drywall large enough to insert one end of a bolt having a spring-loaded toggle nut threaded thereon through the opening. The toggle nut is held in a smaller configuration while it is being passed through the opening. Upon reaching the back side of the drywall, the toggle nut converts to a larger configuration due to bias from the spring. In its larger configuration, the toggle nut is too large to pass through the opening and supports the fixture from the back side of the drywall upon tightening of the bolt. The use of anchors and toggle bolts is inconvenient because it requires the user to first make a suitable hole in the drywall and then install the anchor or toggle bolt. Further, the hole that is required is usually rather large, increase the difficulty in repairing the hole if the mounting fixture is to be removed. Thus, the anchors and toggle bolts are fairly inconvenient to use.

There also exists in the prior art a self-locking unitary wire-type hook which is adapted to be self-drilling through the thickness of a drywall and thereupon further threaded through the relatively small hole created through the drywall, with a hook portion of the device remaining exposed on the front side of the drywall for receiving an item hung thereupon and the forward end of the wire engaging the back side of the drywall to lock the hook in place. Wire hooks of this sort have been sold as a "Heavy Duty Wall Hanger" from NB Industries Inc. of Golden, Colo. This hook (which is shown in FIG. 17) has several advantages including its relative simplicity, the fact that no tools are required to install the hook in drywall, and the self-locking feature. However, the hook portion of this device is relatively small and projects away from the drywall only a short distance. It is therefore limited as to the types of items which can be successfully hung on the hook. While the hook is suitable for hanging pictures, for example, flexible items are not readily held in place on the drywall by using this, prior art hook device. Likewise, the hook is not suitable for supporting curtain rods or other items that are spaced away from the drywall in use.

Thus, there is a need for a simple, user-friendly, and secure system for mounting decorative items such as curtains, canopies, drapes, and the like on drywall.

SUMMARY

One embodiment of the invention is an assembly for mounting an object on a wall or ceiling panel having a front side and a back side opposite the front side. The assembly comprises a wire hook configured so that it can be received in an opening extending through the panel from the front side to the back side so that only a relatively short hook portion extends from the front side of the panel, while a relatively longer segment of the wire hook at an opposite end thereof extends from the opening at the back side of the panel to engage the back side of the panel at a location spaced from the opening. The assembly also comprises an object holder for holding the object. The object holder has a mounting portion defining a bore for receiving the hook portion of the wire hook. The object holder has an arm extending from the mounting portion and defining a support surface for supporting the object.

Another aspect of the invention is a mounting installation. The installation comprises a panel having a front side and a back side opposite the front side. The panel has an opening therein extending between its front and back sides. A wire hook is received in the opening. The wire hook has relatively short hook portion extending from the front side of the panel and a relatively longer segment at an end opposite the hook portion. The relatively longer segment extends from the opening at the back side of the panel to engage the back side of the panel at a location spaced from the opening. The installation also comprises an object holder for holding an object. The object holder has a mounting portion defining a bore for receiving the hook portion of the wire hook. The object holder has an arm extending from the mounting portion and defining a support surface for supporting the object.

BRIEF DESCRIPTION OF THE DRAWINGS

FIGS. 8 and 8A are side views of the drywall mounting installation illustrating a sequence in which the installation reacts to progressively increased loading from the weight of an object supported by the installation;

Corresponding reference characters indicate corresponding pants throughout the drawings.

DETAILED DESCRIPTION

Figure 1:
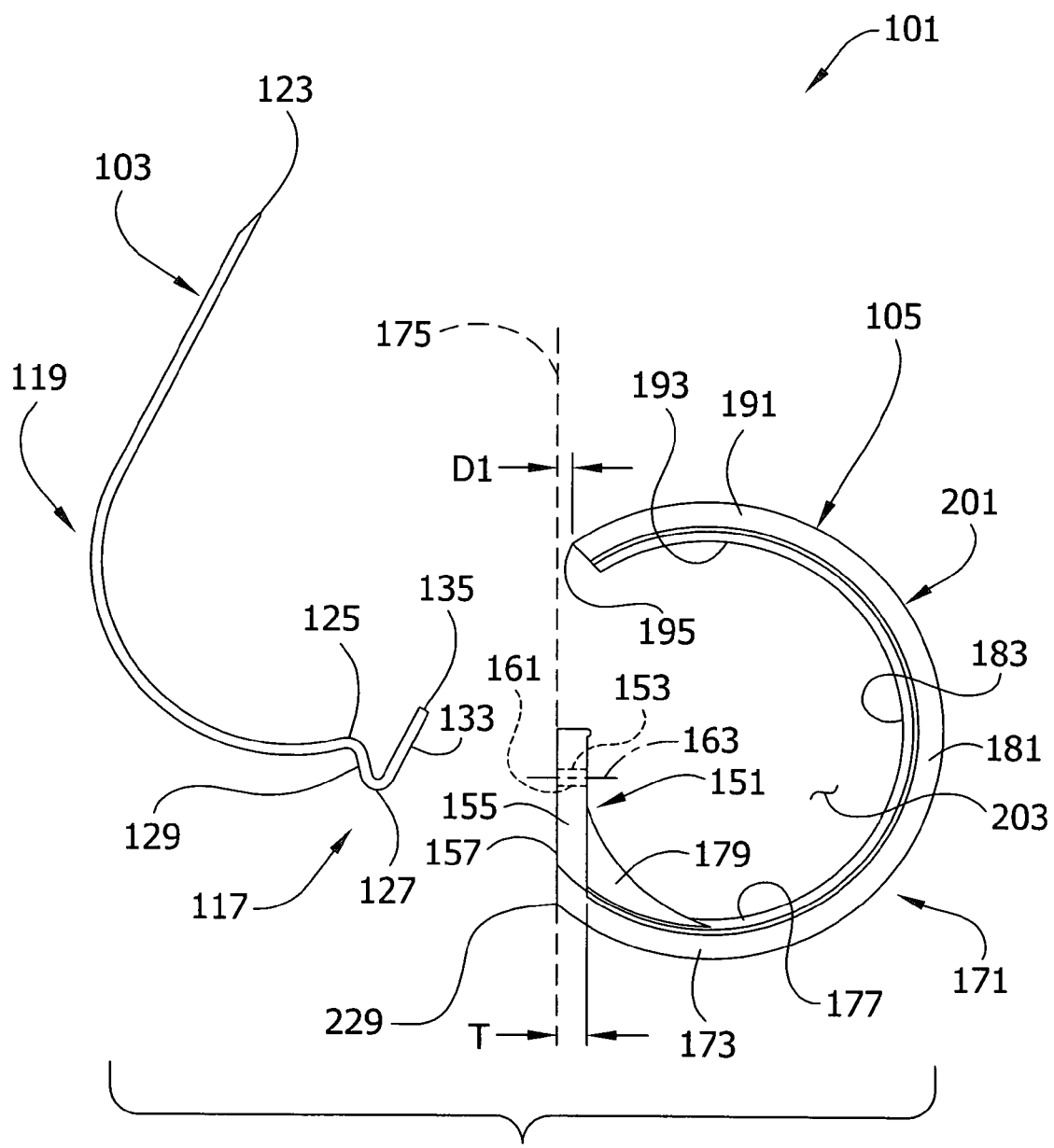
FIG. 1 is a side view of one embodiment of a mounting assembly of the present invention shown in an unassembled state.
Figure 2:
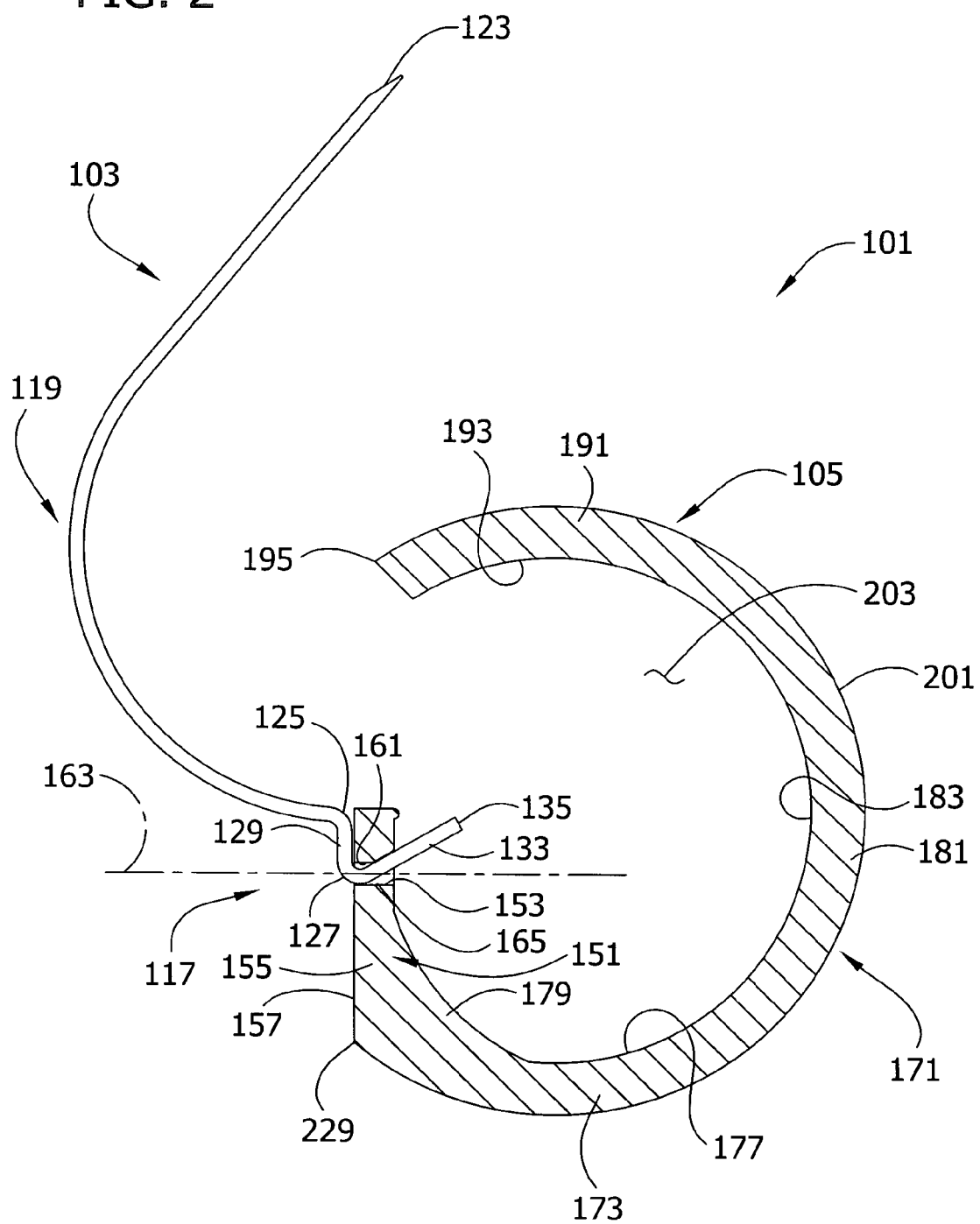
FIG. 2 is a side view of the mounting assembly showing an end of a wire hook of the assembly received in a bore in an object holder.
Figure 3:
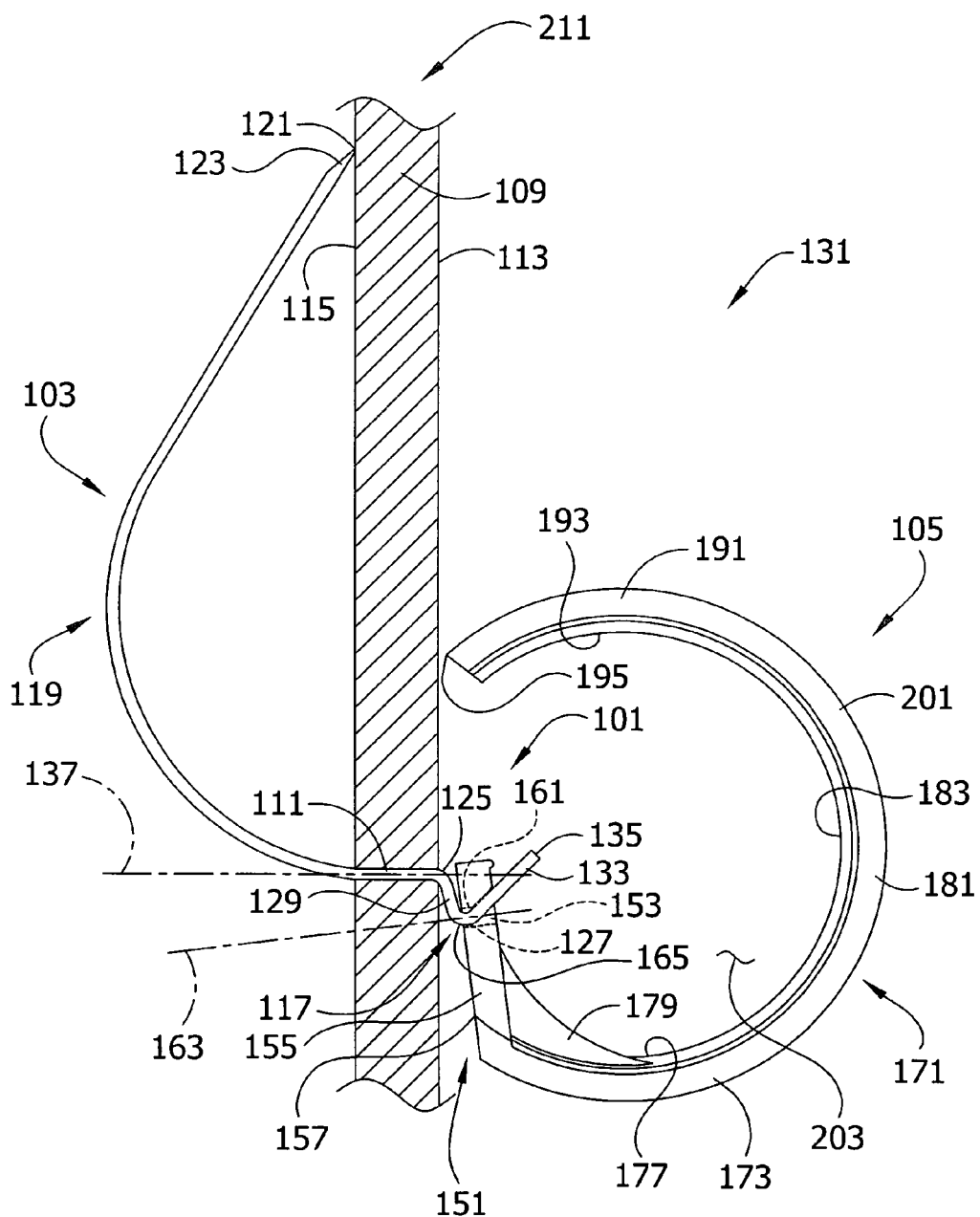
FIG. 3 is a side view of one embodiment of a drywall mounting installation of the present invention.

Referring to the drawings, initially to FIGS. 1 and 2, one embodiment of a mounting assembly of the present invention is generally designated 101. The mounting assembly comprises a wire hook 103 and an object holder 105. The wire hook 103 is adapted to be self-driven through the thickness of a wall or ceiling panel (e.g., a sheet of drywall). Broadly speaking, the wire hook 103 is configured to be received in an opening 111 in the panel 109 (e.g., an opening of its own making) extending from the front side 113 to the back side 115 so that only a relatively short hook portion 117 at one end of the wire hook protrudes from the front side, while a longer portion 119 of the wire hook at an opposite end thereof extends from the opening at the back side 115 to engage the back side of the panel at a location 121 spaced from the opening (FIG. 3). The object holder 105 can be hung on the hook portion 117 of the wire hook 103 to form a mounting installation 131 of the present invention. Although the invention is not so limited, the mounting assembly 101 and installation 131 of the present invention are suitable for use in interior decorating. For example, the object holder can be used to hold a rod (e.g., a curtain rod), swag, canopy, piece of fabric, or other decorative object. Further, although the embodiments shown and described herein are installed in a drywall panel, the assembly and installation can be installed in other types of wall and ceiling panels, including those made of plaster, thin wood panels, and/or other materials capable of being pierced (preferably manually) by the wire hook.

Figure 17:
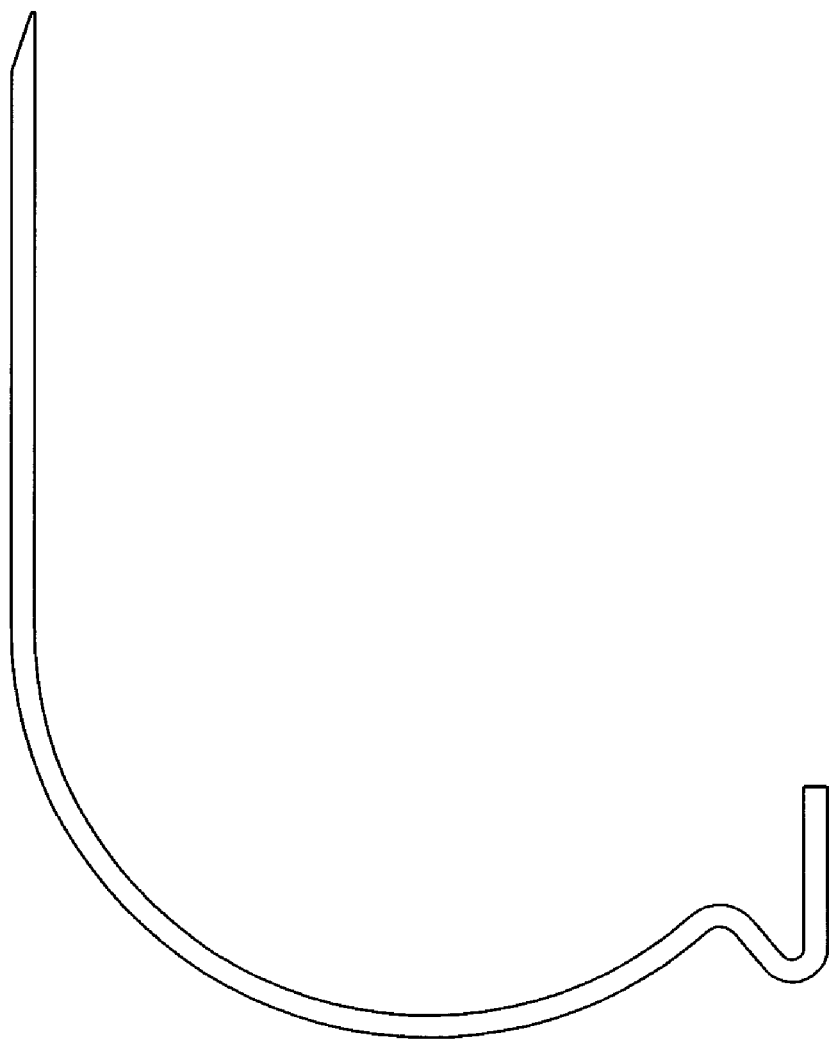
FIG. 17 is a side view of a prior art wire hook used to hang pictures on drywall.

As seen in FIG. 1, for example, the wire hook 103 of the illustrated embodiment is formed of a stiff wire which is bent into a partial loop portion 119 and a hook portion 117. The distal end 123 of the loop portion 119 is chiseled to define a cutting tip for penetrating a drywall panel. At the proximal end of the loop portion 119 the wire hook defines a double-bent V-shaped hook portion 117 which includes first 125 and second 127 bends. A segment 129 of the wire between the first and second bends 125, 127 is configured to extend from the opening 111 at the front side 113 of the drywall panel 109 generally along the front side of the drywall panel (e.g., at an acute angle relative thereto) when the wire hook 103 is received in the opening as shown in FIG. 3. A segment 133 of the wire hook 103 between the second bend 127 and the proximal end 135 of the wire hook is configured to extend from the second bend away from the drywall panel 109 at an angle relative to the front side 113 of the drywall panel toward an axis 137 through the opening ill, and more preferably beyond that axis. The segment 133 between the second bend 127 and the proximal end 135 of the wire hook 103 is preferably straight. Although the hook portion 117 of the illustrated embodiment is V-shaped, it is understood that the wire hook can have other configurations (e.g., a U-shaped hook portion) without departing from the scope of the invention. The wire hook 103 is suitably formed from steel spring wire. The wire hook 103 can be made from other materials, as long as the wire hook has sufficient strength to support the weight of the object to be supported by the mounting installation 131. The prior art wire hook shown in FIG. 17 is suitable for use as the wire hook. However, other wire hooks can be used without departing from the scope of the invention.

The object holder 105 is adapted to engage and be supported by the wire hook 103 (i.e., be hung on the hook portion 117) when the wire hook is installed in a drywall panel 109. For example, the object holder 105 may have a mounting portion 151 at one end having a bore 153 therein (e.g., a throughbore) sized to receive at least the proximal end 135 of the wire hook 103. In the illustrated embodiment, for example, the mounting portion 151 is configured to be a generally rectangular mounting block 155. The mounting block 155 preferably has a drywall panel-facing surface 157 (e.g., a substantially flat surface) configured to face generally toward the drywall panel 109 when the hook portion 117 of the wire hook 103 installed in the drywall panel is received in the bore 153. The bore 153 extends into the drywall panel-facing surface 157 of the mounting portion 151.

The bore 153 is preferably substantially cylindrical over at least a portion of its length to limit pivotal movement of the object holder 105 relative the wire hook 103 when the wire hook is received in the bore. The bore 153 of the illustrated embodiment, for example, comprises a substantially cylindrical portion 161 adjacent the drywall panel-facing surface 157 of the mounting block. The substantially cylindrical portion 161 of the bore 153 is preferably disposed at angle relative to the drywall panel-facing surface 157 that is different than the angle between the wire segment 133 at the proximal end of the wire hook 103 and the front side 113 of the drywall panel 109 of the illustrated embodiment when the wire hook is installed in the drywall panel. For example, the substantially cylindrical portion 161 of the bore 153 may be generally perpendicular to the drywall panel-facing surface 157. The substantially cylindrical portion 161 of the bore 153 is preferably sized to provide sufficient clearance for the wire hook 103 to be received in the bore without little to no frictional resistance. However, the amount of clearance is preferably also low enough to require substantial alignment between a longitudinal axis 103 of the cylindrical portion 101 of the bore 153 and any segment of the wire hook 103 that is received in the cylindrical portion of the bore, thereby limiting pivotal movement of the object holder 105 relative to the wire hook 103.

In the embodiment shown in FIGS. 2 and 3, the substantially cylindrical portion 161 of the bore 153 extends to a wider portion 165 of the bore. For example, the wider portion 165 shown in FIGS. 2 and 3 increases in cross sectional area as it extends away from the cylindrical portion 161 of the bore 153. It is contemplated that the bore 153 may initially be substantially cylindrical and have a substantially uniform diameter over its entire length (as shown in FIG. 1) and that the wire hook 103 may widen part of the bore during use (e.g. by wearing and/or deforming the mounting portion 151 of the object holder 105 in use or upon insertion of the wire hook into the bore), particularly if the object holder is made of a material (e.g, a plastic material) that is softer and/or less wear resistant than the wire hook. The object holder 105 can also be manufactured so that the bore 153 has both a substantially cylindrical portion 161 and the wider non-cylindrical portion 165 or another wider substantially cylindrical portion without departing from the scope of the invention. The advantage of designing the assembly 101 so that use of the wire hook 103 with the object holder 105 widens part of the bore 153 is that it may be cheaper to manufacture a straight cylindrical bore of uniform diameter. It is also contemplated that the bore may be substantially cylindrical and have a substantially uniform diameter over its entire length (both as manufactured and in use) without departing from the scope of the invention.

additional width of wider portion 165 of the bore 153 allows the object holder 105 to pivot relative to the wire hook 103 while the curved part of the wire hook at the second bend 127 is being inserted in the substantially cylindrical portion 161 of the bore in that it provides clearance for the segment 133 of wire at the end of the wire hook to move away from the longitudinal axis 163 of the cylindrical portion 161 of the bore. This allows more of the wire hook 103 to be received in the bore 153 and allows the object holder 105 to be positioned closer to the drywall panel 109 when it is hung on the wire hook 103. Even though this feature allows some pivotal movement of the object holder 105 relative to the wire hook 103, the only significant pivotal movement that is permitted in the illustrated embodiment is associated with the inserting of a curved segment of the wire hook (e.g., at the second bend 127) into the cylindrical portion 161 of the bore 153. Once the object holder 105 is mounted on the wire hook 103 in the mounting installation 131, pivotal movement of the object holder relative to the wire hook not associated with withdrawal of the wire hook from the bore 153 is substantially prevented by the relatively small amount of clearance for the wire hook in the cylindrical portion 161 of the bore 153.

Figure 10:
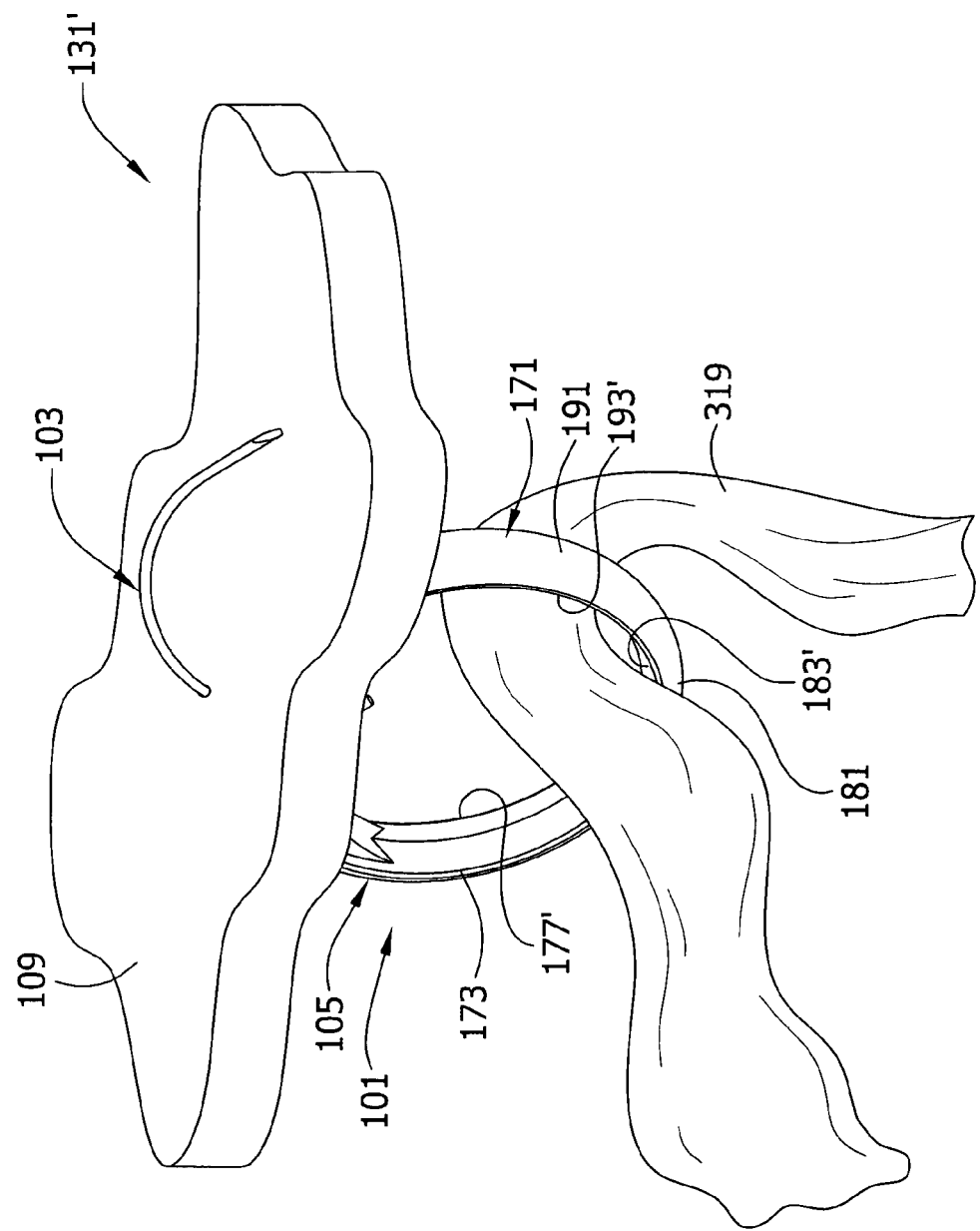
FIG. 10 is a perspective view of the mounting installation installed on a ceiling and holding a flexible material.

The object holder 105 has an object holding arm 171 connected to its mounting portion 151. Broadly speaking, the object holding arm 171 has a support surface for supporting the weight of the object and preferably also includes a retaining surface for inhibiting horizontal movement of the object off the support surface. In the embodiment shown in the drawings, for example, the arm 171 comprises a first portion 173 extending away from the mounting portion 151 in a direction that includes a component that is opposite the direction faced by the drywall-facing surface 157. In the illustrated embodiment, the first portion 173 of the arm 171 is offset from the bore 153 in a direction parallel to a plane 175 (FIG. 1) containing the drywall panel-facing surface 157. The first portion 173 of the arm 171 has an inner surface 177 generally facing the longitudinal axis 163 of the cylindrical portion 161 of the bore 153. That surface 177 is a support surface when the assembly 101 is installed on wall (FIG. 3) and a retaining surface when the assembly is installed on a ceiling (FIG. 10). It may be desirable to provide structural reinforcement (e.g., a large fillet 179 as shown in the illustrated embodiment) at the connection between the first arm portion 173 and the mounting portion 151 to help the arm 171 support the weight of the object. A second portion 181 of the arm 171 is connected to the first portion 173 and spaced away from the mounting portion 151 by the first portion of the arm. The second arm portion 181 has an inner surface 183 facing a direction that has a component in the same direction as the direction faced by the drywall-facing surface 157. That surface 183 of the second arm portion 181 is a retaining surface when the assembly is installed on wall and a support surface when the assembly is installed on a ceiling. In the illustrated embodiment, the arm 171 also has a third portion 191 connected to an end of the second arm portion 181 opposite the first arm portion 173. The third arm portion 191 is supported by the second arm portion 181 and has an inner surface 193 facing generally toward the first arm portion 173.

When the assembly 101 is installed on a wall (FIG. 3), the third arm portion 191 decreases the risk that an object held by the holder 105 will be bumped up and out of the holder. When the assembly 101 is installed on a ceiling (FIG. 10), the third arm portion 191 provides another retaining surface opposite the retaining surface of the first arm portion. The third arm portion 191 preferably extends from the second arm portion 181 to define an end 195 of the object holder 105 that is positioned on or near the plane 175 containing the drywall panel-facing surface 157 of the mounting portion 151. For example, in one embodiment of the invention, the distance D1 (FIG. 1) between the end 195 of the object holder 105 and the plane 175 containing the drywall panel-facing surface 157 is preferably no more than about 0.75 inches, more preferably no more than about 0.5 inches, and still more preferably no more than about 0.25 inches.

The arm can have various configurations without departing from the scope of the invention. In the embodiment shown in FIGS. 1 and 2, for example, the arm 171 includes a crescent-shaped (e.g., a ring shaped) portion 201 extending along a continuously curved path from the mounting portion 151 to the opposite end 195 of the arm, thereby at least partially enclosing an area 203 for receiving the object to be held by the installation 131 and forming the arm portions 173, 181, 191. It is noted that the arm could have a different curvature or be polygonal in shape (e.g., a square or rectangular bracket) without departing from the scope of the invention.

When the assembly 101 is installed on drywall panel 109 of a vertical wall 211, as shown in FIG. 3 for instance, the first arm portion 173 includes an upward facing support surface 177 and the second arm portion 181 includes a retaining surface 183. The retaining surface 183 faces in a direction having a component that is normal to the wall 211. For example, the retaining surface may slope upward as it extends away from the wall 211 or be substantially vertical. Recognizing that steeper retaining surfaces reduce the risk that the object will accidentally fall off the holder 105, the retaining surface 183 of the wall mounted installation 131 preferably includes a portion that is inclined at least about 30 degrees, more preferably at least about 45 degrees, and still more preferably at least about 60 degrees. In the illustrated embodiment, for example, the retaining surface 183 comprises a vertical surface (i.e., a surface inclined at 90 degrees). The retaining surface 183 is held in spaced relation with respect to the wall 211 by the first arm portion 173. The support surface 177 of the wall mounted installation 131 is preferably at a lower elevation than the bore 153 (e.g., as a consequence of the offset between the first arm portion 173 and the longitudinal axis 163 of the bore) so that weight W1 of the object (See FIG. 8) is applied to the to the object holder 105 at a lower elevation than the upward force applied to the object holder by the wire hook 103. This makes the object holder 105 resistant to rotation on the longitudinal axis 163 of the cylindrical portion 161 of the bore 153 when it is loaded with the weight of the object and facilitates achieving rotational stability of the object holder with only a single connection between the holder and the wire hook 103. As will be explained in more detail below, in the embodiment shown in the drawings, this also helps prevent the object holder 105 from being accidentally unhooked from the wire hook 103 when it is supporting the weight W1 of the object.

Figure 4:
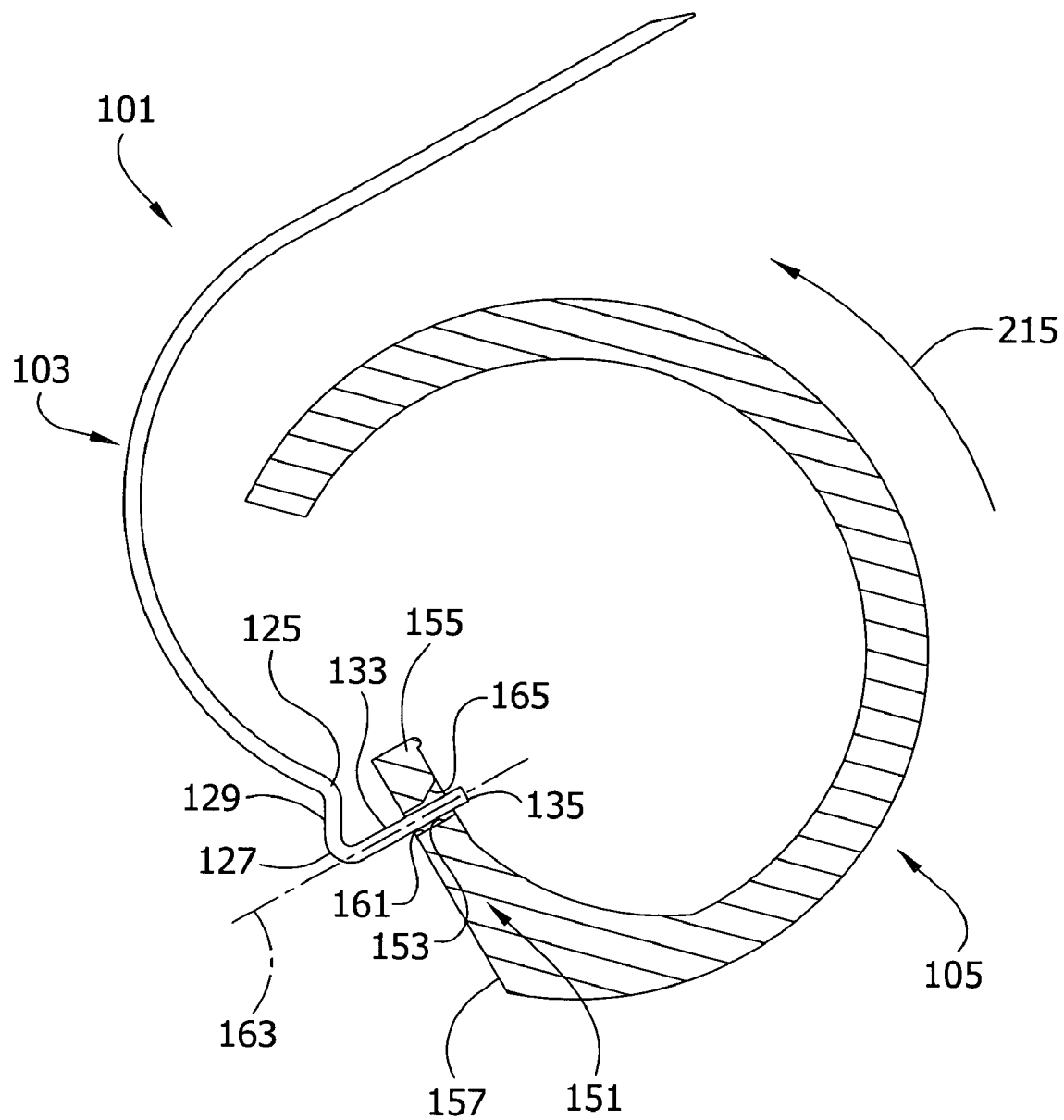
FIG. 4 is a side view of the mounting assembly showing the object holder after it has pivoted in a plane containing the wire hook to provide clearance for the end of the wire hook to be withdrawn from the bore to release the object holder from the wire hook.
Figure 5:
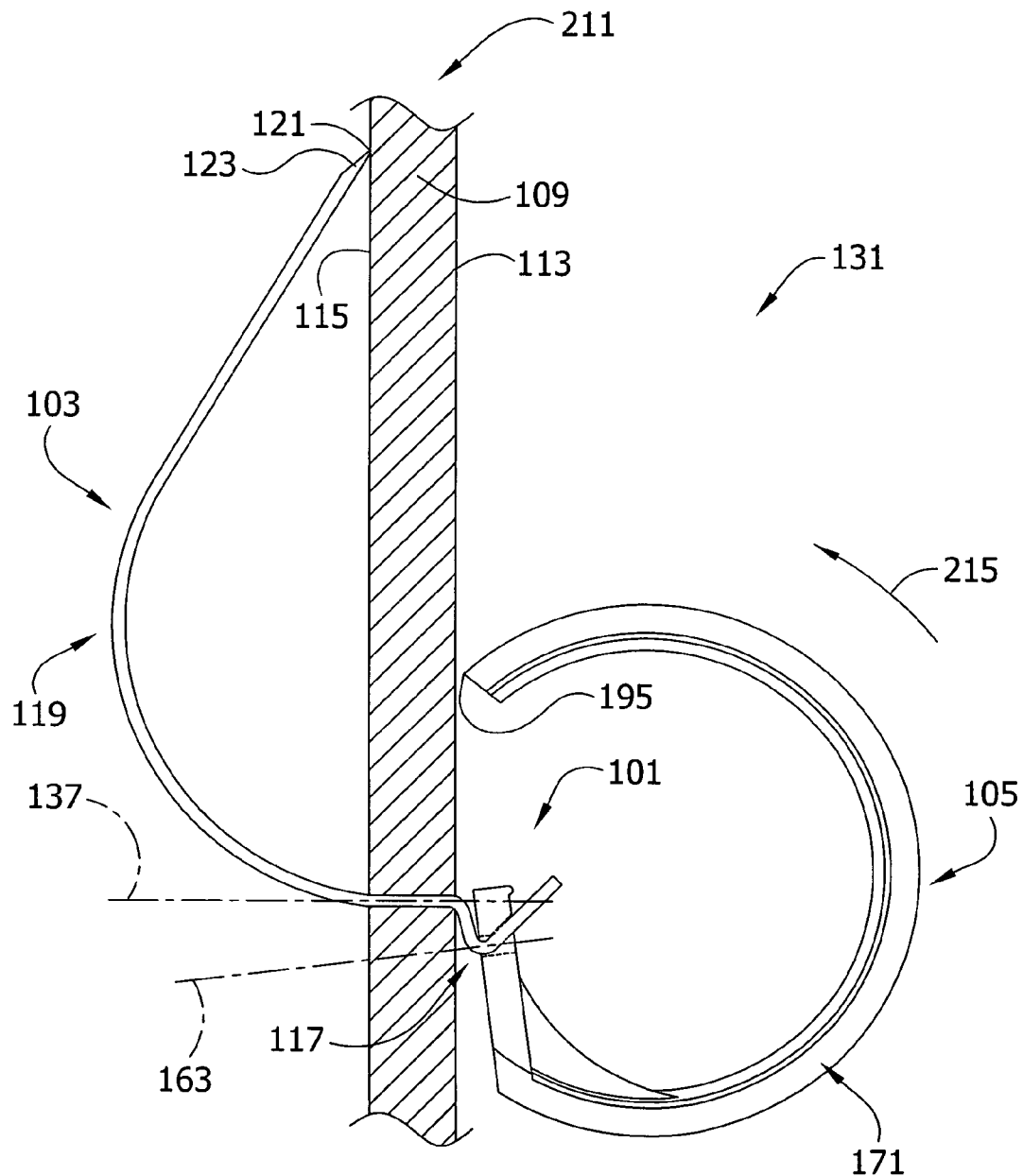
FIG. 5 is a side view of the drywall mounting installation showing the drywall obstructing pivotal movement of the object holder in a plane containing the wire hook sufficient to release the object holder from the wire hook.

As noted above, the arm 171 is preferably configured so that the end 195 of the object holder 105 opposite the mounting portion 151 is on or near the plane 175 containing the drywall panel-facing surface 157 of the mounting portion. A consequence thereof is that the end 195 of the object holder 105 is close to the drywall panel 109 when the assembly 101 is installed on the wall 211. Not only does this make it less likely that the object can be accidentally bumped up and out of the holder 105, it also makes it less likely that the object holder can be accidentally bumped off the wire hook 103. As shown in FIG. 4, in the uninstalled assembly 101 pivotal movement of the object holder 105 (in the direction of the arrow 103 on FIG. 4) can bring the segment 133 at the end of the wire hook 103 into alignment with the longitudinal axis 163 of the cylindrical portion 161 of the bore 153, which allows the wire hook to be pulled out of the bore. However, when the assembly 101 is installed, and the second bend 127 of the wire hook 103 is inserted into the cylindrical portion 161 of the bore 153 (as shown in FIG. 5), for example, any upwardly directed bumps that might otherwise cause the object holder to pivot in the direction of the arrow 215 on FIG. 5 will cause the end 195 of the arm 171 to contact the front side 113 of the drywall panel 109 before the object holder 105 has pivoted enough for the segment 133 at the end of the wire hook 103 to align with the longitudinal axis 103 of the cylindrical bore 153. In this regard, the wire hook 103 is held captive in the bore 153 by the object holder 105, thereby holding the object holder on the wire hook. Accordingly, when the end 195 of the arm 171 contacts the drywall panel 109 and thereby obstructs further pivotal movement of the object holder 105 in the direction of the arrow 215, the arm holds the object holder in a position in which the wire hook 103 is held captive in the bore by the object holder.

Figure 6:
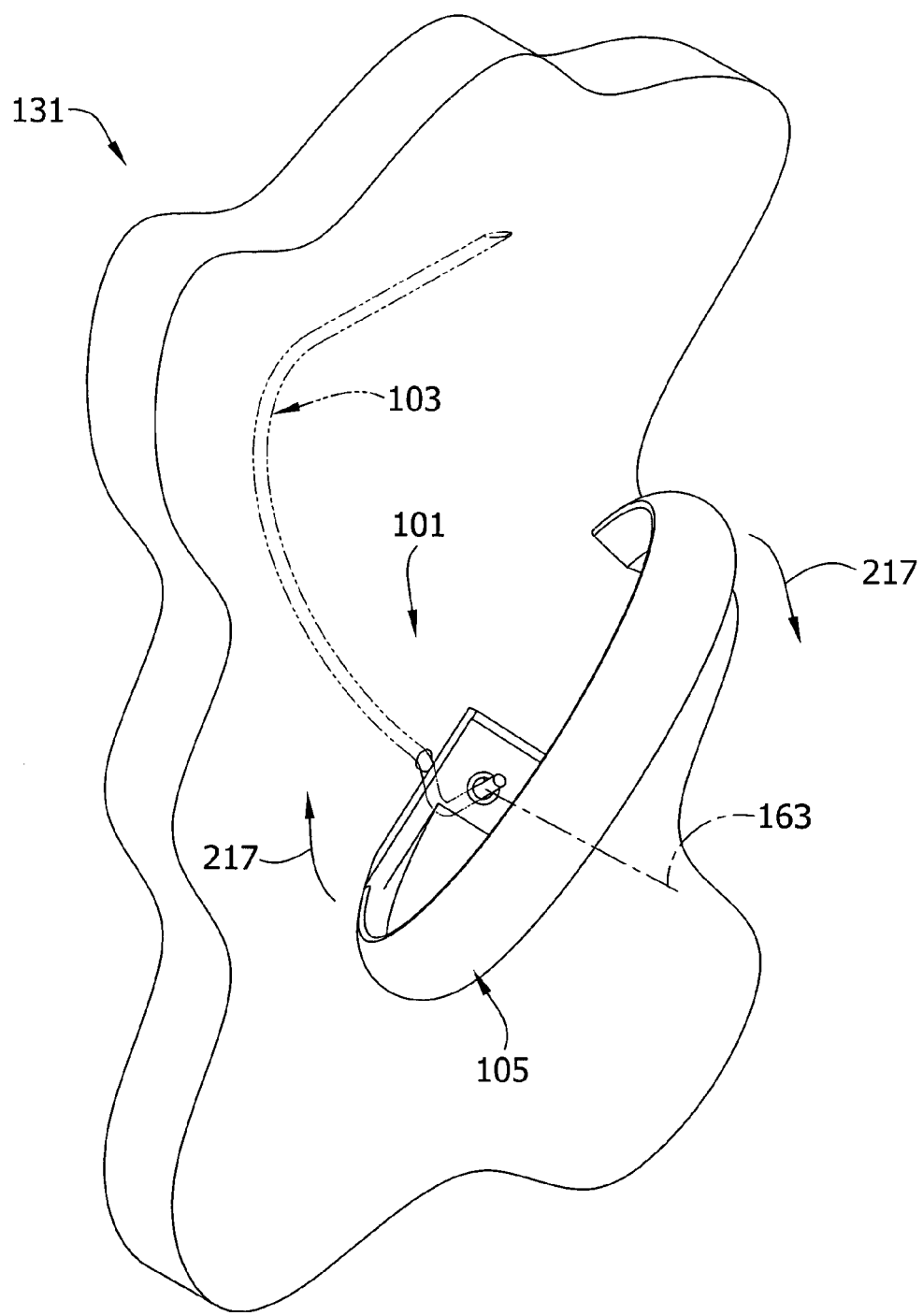
FIGS. 6 and 7 are perspective views of the mounting installation illustrating a sequence of the object holder being rotated to release the object holder from the wire hook.

In order to detach the object holder 105 from the wire hook 103 of the embodiment shown in the drawings, the object holder is first rotated generally on the longitudinal axis 163 of the cylindrical portion 161 of the bore 153 (as shown by the arrows 217 in FIG. 6). After some rotation in this manner, it becomes possible to pivot the object holder 105 so the second arm portion 181 moves toward the drywall panel 109 (as indicated by the arrow 219 shown on FIG. 7) to align the segment 133 at the end of the wire hook 103 with the longitudinal axis 163 of the cylindrical portion 161 of the bore 153 and then pull the object holder off the wire hook. When the weight W1 of the object (FIG. 8) is applied to the support surface 177 (which is at a lower elevation than the hook portion 117 of the wire hook in the illustrated embodiment), any rotation of the holder 105 on the longitudinal axis 163 of the cylindrical portion 161 of the bore 153 is countered by a moment resulting from offset application of the downward force exerted on the holder by the weight of the object and the upward force exerted on the holder by the hook portion of the wire hook 103. This makes it unlikely that the holder 105 can be accidentally unhooked from the wire hook 103 while the holder is loaded with the weight of an object.

Figure 7:
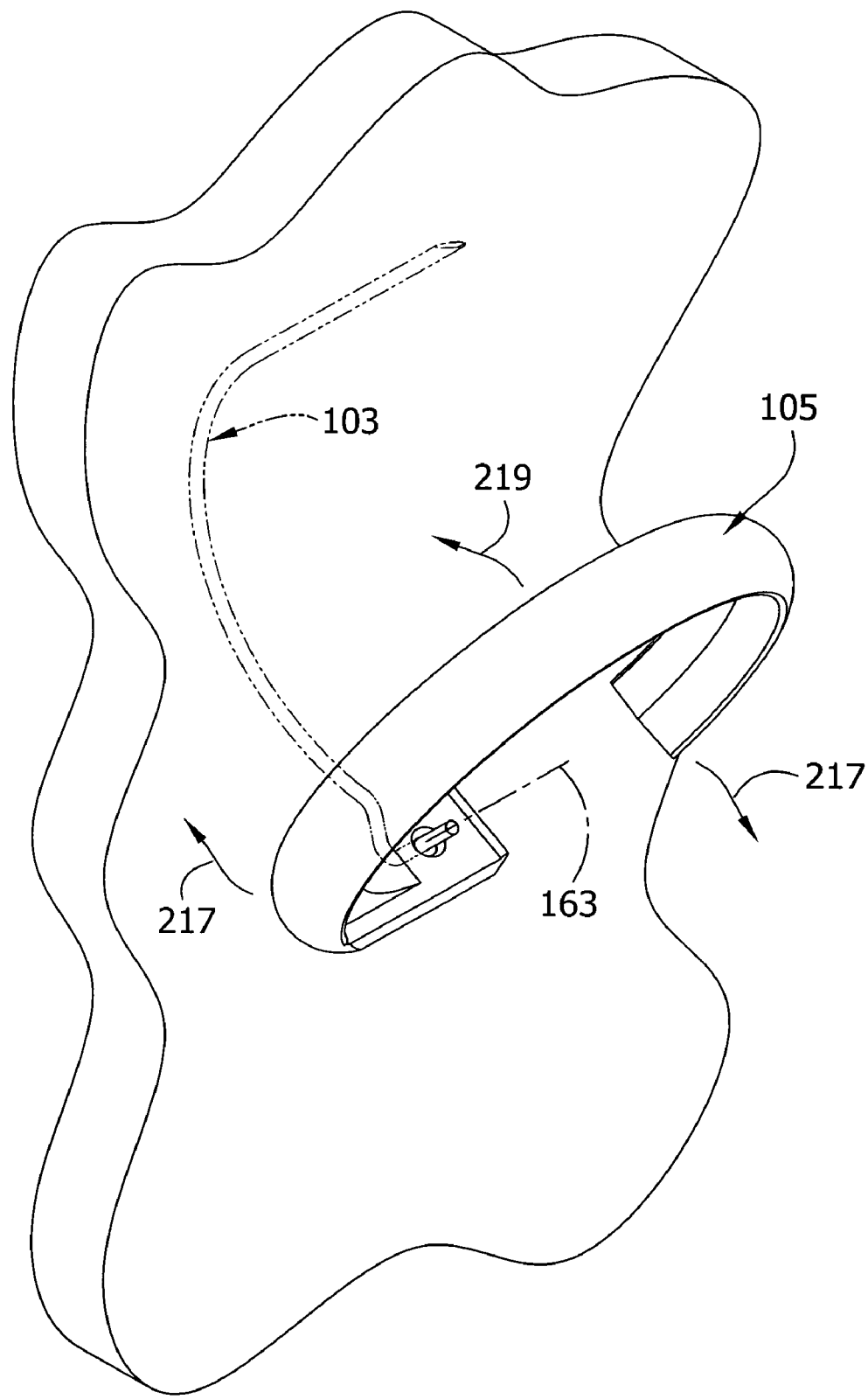

In order to hang the object holder 105 on the wire hook 103 so that the curved portion of the wire hook at the second bend 127 is received in the bore 153 (either in the initial installation or to replace an object holder that has been removed), the process is reversed. In other words, the proximal end 135 of the wire hook 103 is first inserted into the bore 153 while the object holder 105 is oriented as shown in FIG. 7 and the object holder is then pivoted in the opposite direction as the arrow 217 to align the longitudinal axis 163 with the orientation of the wire at the bend 127 and rotated in the opposite direction as the arrows 215 shown on FIGS. 6 and 7 until the third arm portion 191 is generally above the first arm portion 173.

Figure 8:
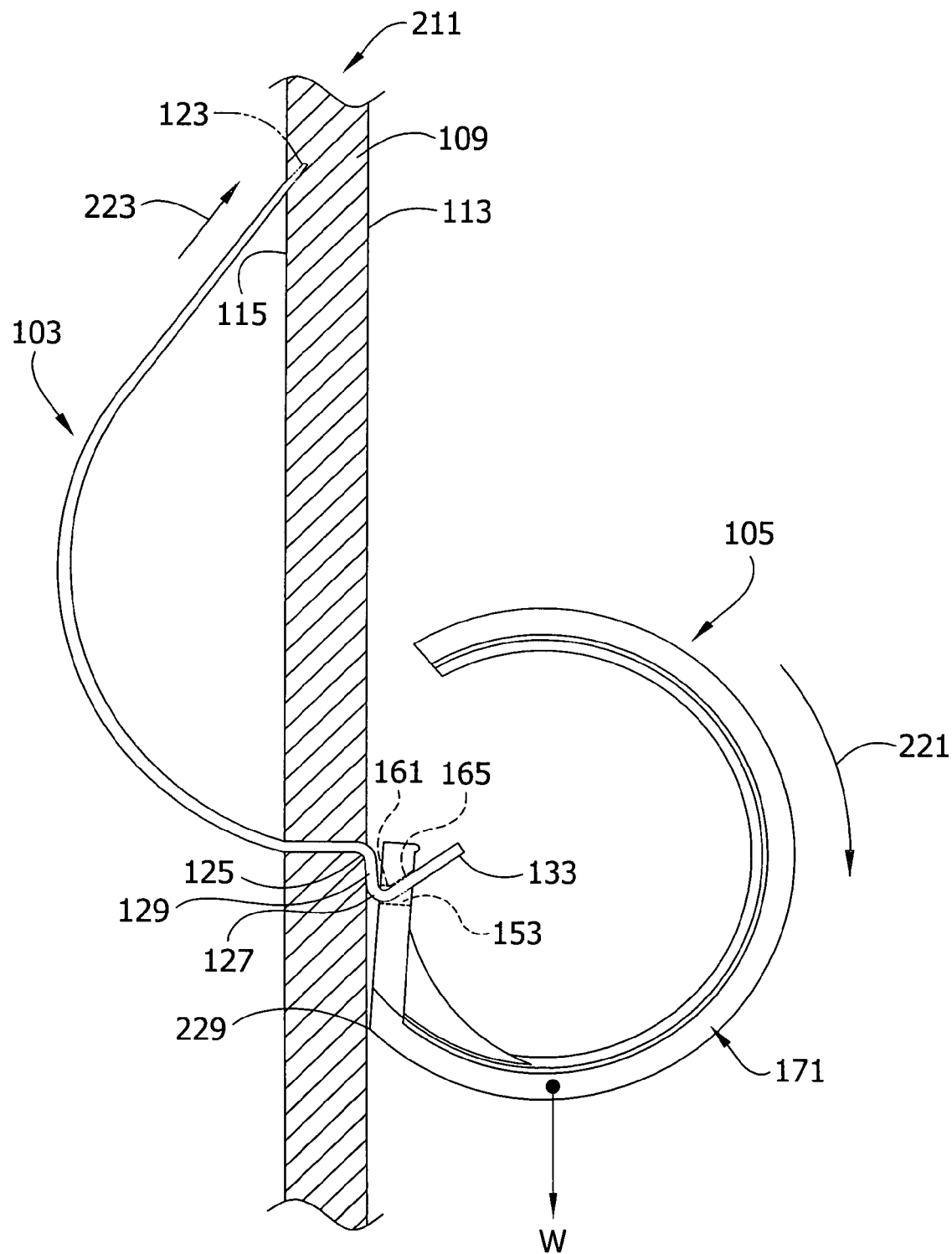

FIGS. 8-8A show a sequence in which the wall mounted installation 131 is loaded with progressively more weight W. Absent any loading of the object holder 105 (as shown in FIG. 3), the wire hook 103 may support the object holder in a position in which the drywall panel-facing surface 157 is disposed at a slight angle relative to the drywall panel 109. This depends on the orientation of the hook portion of the wire hook, which can be varied depending on the configuration of the wire hook as well as the orientation in which the wire hook is installed in the wall. As shown in FIG. 3, the segment 129 of the wire hook 103 between the first and second bends 125, 127 is also at a slight angle relative to the drywall panel 109 in the unloaded wall mounted installation 131. Initial loading of the object holder 105 tends to make the object holder and hook portion 117 of the wire hook 103 rotate in the direction of the arrow 221 on FIG. 8, which results in the distal end 123 of the wire hook 103 being urged toward the back side 115 of the drywall panel 109 (as indicated by the arrow 225 on FIG. 8). One advantage of this is that the distal end 123 of the wire hook 103 engages the back side 118 of the drywall panel 109 more securely, perhaps even being slightly embedded in the back side 115 of the drywall panel as shown in FIG. 8. After sufficient loading, the bottom 229 of the mounting portion 151 may contact the front side 113 of the drywall panel 109. If this happens, the bottom 229 of the drywall panel-facing surface 157 becomes a fulcrum about which any additional rotation of the object holder 105 is centered. Thus, after the bottom 229 of the mounting portion 151 contacts the drywall panel 109, the center of rotation changes as indicated by the arrow 331 having a radius of curvature centered on the bottom of the mounting portion. Additional loading of the object holder 105 thereafter may tend to cause the installation 131 to sag by pulling a little bit more of the wire hook 103 out of the opening 111 on the front side 113 of the drywall 103, as shown in FIG. 8A.

Figure 9:
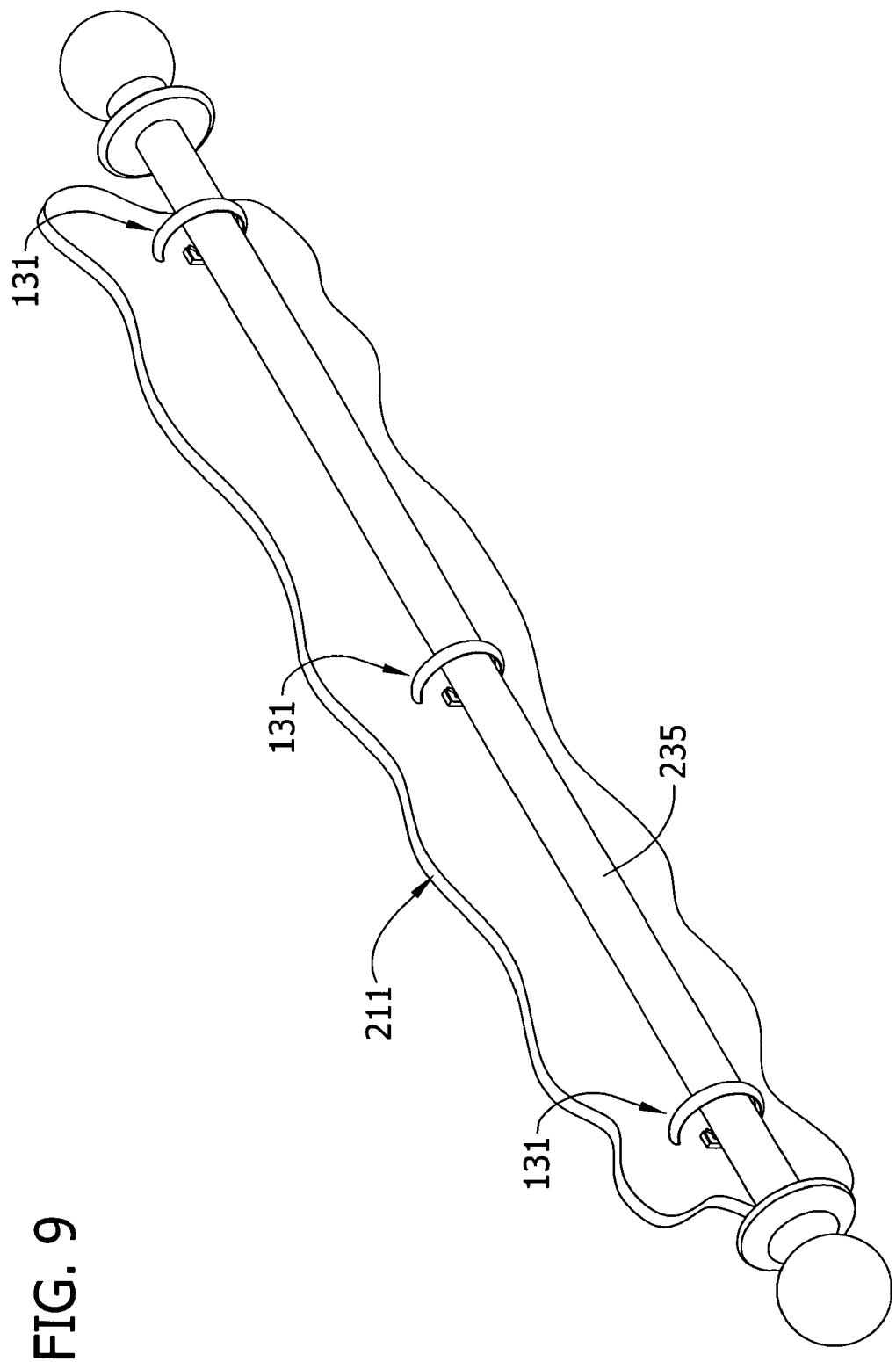
FIG. 9 is a perspective view of the three mounting installations together holding a curtain rod.

Sagging of the installation 131 is undesirable in some applications and can be avoided by design of the mounting assembly 101 to withstand the expected loading without sagging. However, sagging is not without its advantages and may be desirable in some applications. For instance, when three or more mounting installations are used to hold a rigid object (such as a curtain rod) it is possible that one or more of the installations will be installed slightly above the intended elevation. If that happens, the weight of the object may be distributed unevenly among the mounting installations. However, when using three or more installations 131 (FIG. 9) of the present invention to hold a rigid object (e.g. a curtain rod 235 mounted above a window or door header (not shown)) any of the installations that are bearing disproportionately more of the weight (for any reason) can sag and thereby redistribute the weight of the object more evenly. This provides some assurance against catastrophic failure of one or more of the mounting installations 131.

When the assembly 101 is installed on a substantially horizontal ceiling drywall panel 109 (as shown in FIG. 10), the second portion 181 of the arm 171 defines an upward facing support surface 183', while the first portion 173 of the arm 171 defines a retaining surface 177' (e.g., a horizonatally-facing surface facing the partially enclosed area 203 above the support surface and/or a surface that slopes downward as it extends toward the support surface). The third arm portion 191 of the ceiling mounted installation 131' provides another retaining surface 193' on the opposite side of the support surface 183' as the first portion 173 of the arm 171 to inhibit the object sliding off the support surface in that direction. The two retaining surfaces 177', 193' of the ceiling-mounted installation 131' help retain the object held by the installation on the support surface 183'. The retaining surface 193' of the third arm portion 191 preferably includes a horizontally-facing surface facing the partially enclosed area 203 above the support surface 183' for additional protection against the object accidentally slipping off the support surface and falling out of the holder 105. However, for some applications the third portion 191 of the arm 171 and its retaining surface 193 may be omitted altogether or the retaining surface may only include a surface that slopes upward as it extends away from the support surface 183'.

Figure 11:
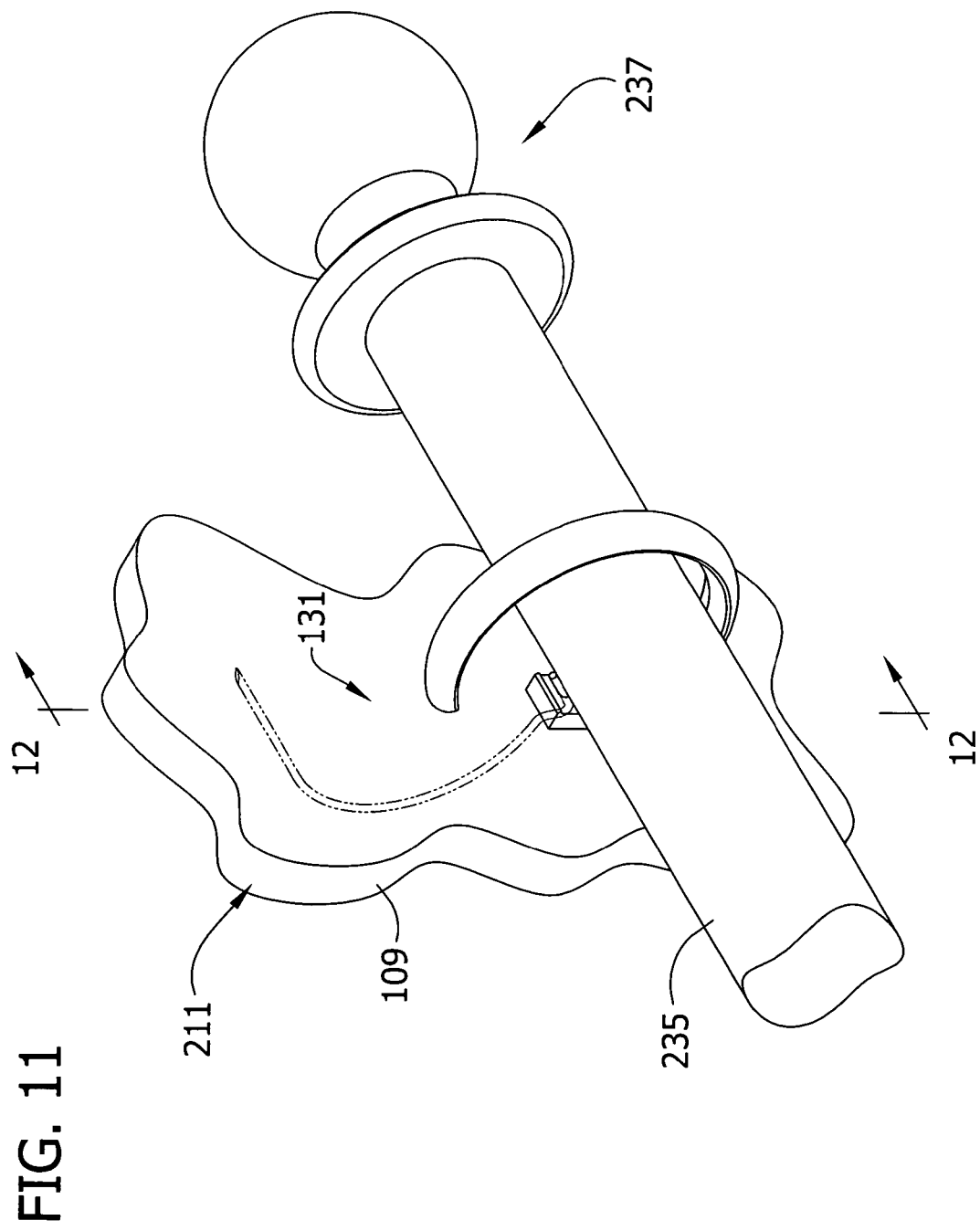
FIG. 11 is a perspective view of the mounting installation holding one end of a curtain rod.
Figure 12:
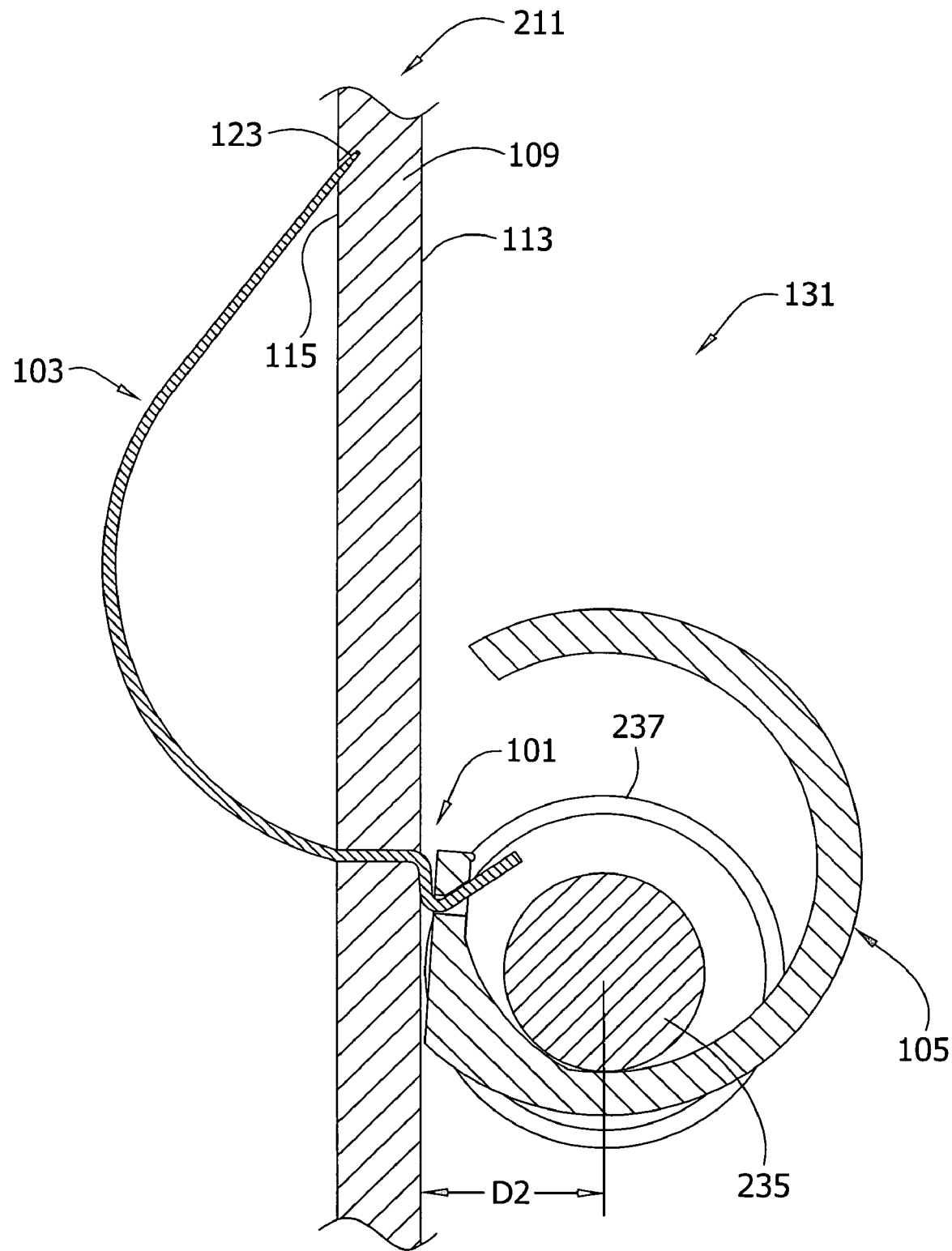
FIG. 12 is a cross section of the mounting installation and curtain rod taken in a plane perpendicular to a longitudinal axis of the curtain rod and through the mounting installation.

The wall and ceiling installations 131, 131' are suitable for holding a wide variety of objects. As shown in FIG. 11, one contemplated use of the installation 131 is to support a rod 235, such as a curtain rod or drapery rod, on the drywall panel 109. Thus, as shown in FIG. 12, the area 203 that is enclosed (or at least partially enclosed) by the arm 171 is preferably large enough to accommodate a curtain rod 235. In one embodiment of the invention, the area 203 is preferably able to receive a rod that is at least about 0.75 inches in diameter, more preferably at least about 1 inch in diameter, still more preferably at least about 1.5 inches in diameter, and even more preferably at least about 2.0 inches in diameter. The particular curtain rod 235 shown in FIGS. 11 and 12, has a larger diameter finial 237 on its end. Although use of larger diameter finial 237 on the end of the rod 235 does not require that the holder 105 be sized large enough to receive the finial, the holder preferably holds the rod far enough away from the drywall panel 109 to provide clearance for the finial. The holder 105 and finial 237 can optionally be designed to insure that the finial does not contact the drywall panel 109. In the wall mounted installation 131 shown in the drawings, for example, the first portion 173 of the arm 171 extends away from the drywall panel 109 a sufficient distance D2 (FIG. 12) so that an object held by the holder is centered a distance D2 (FIG. 12) from the wall preferably in the range of about 0.5 inches to about 2.5 inches, and more preferably a distance in the range of about 0.75 inches to about 2.0 inches, and still more preferably in the range of about 0.75 inches to about 1.5 inches. In the ceiling mounted installation, the object holder 105 the object is centered at least the same distance from the drywall panel 109 because the first arm portion 173 is closer to the drywall panel than the second arm portion 181, which supports the object in the ceiling-mounted installation 131'.

Figure 13:
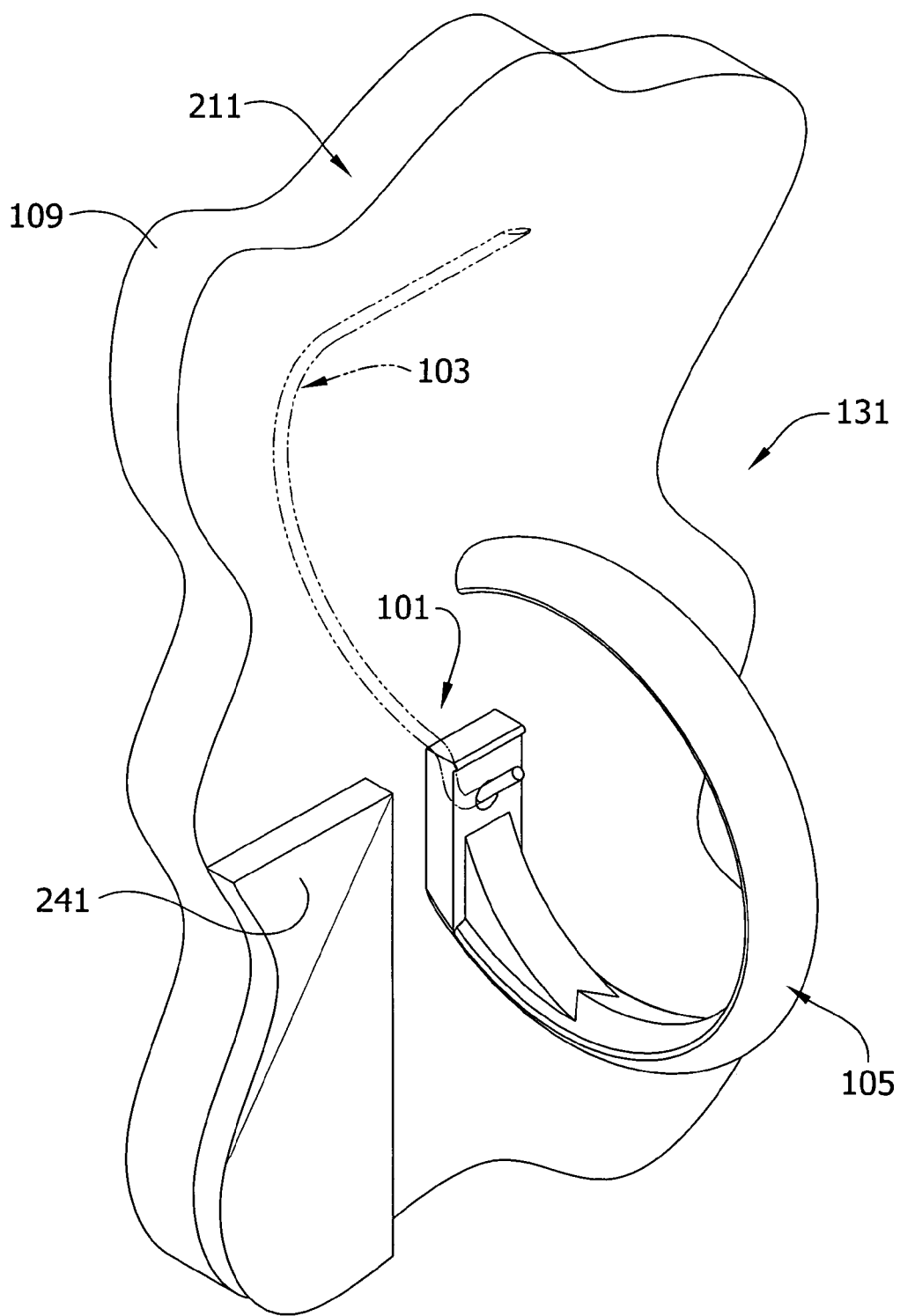
FIG. 13 is a perspective view of the mounting installation installed adjacent a piece of molding affixed to the drywall.

The wall mounted installation 131 is also suitable for use adjacent molding 241 (e.g., adjacent molding around a window as shown in FIG. 13) because it holds the object (e.g. rod 235) far enough away from the wall to provide space for the molding. The mounting block 155 of the illustrated embodiment has a thickness T (FIG. 1) that is about the same as the thickness of typical molding. For example, in one embodiment, the thickness T of the mounting block 155 is preferably in the range of about 0.15 to about 0.75 inches. Optionally, the holder 105 can be designed to hold the object spaced from the molding 241.

Figure 14:
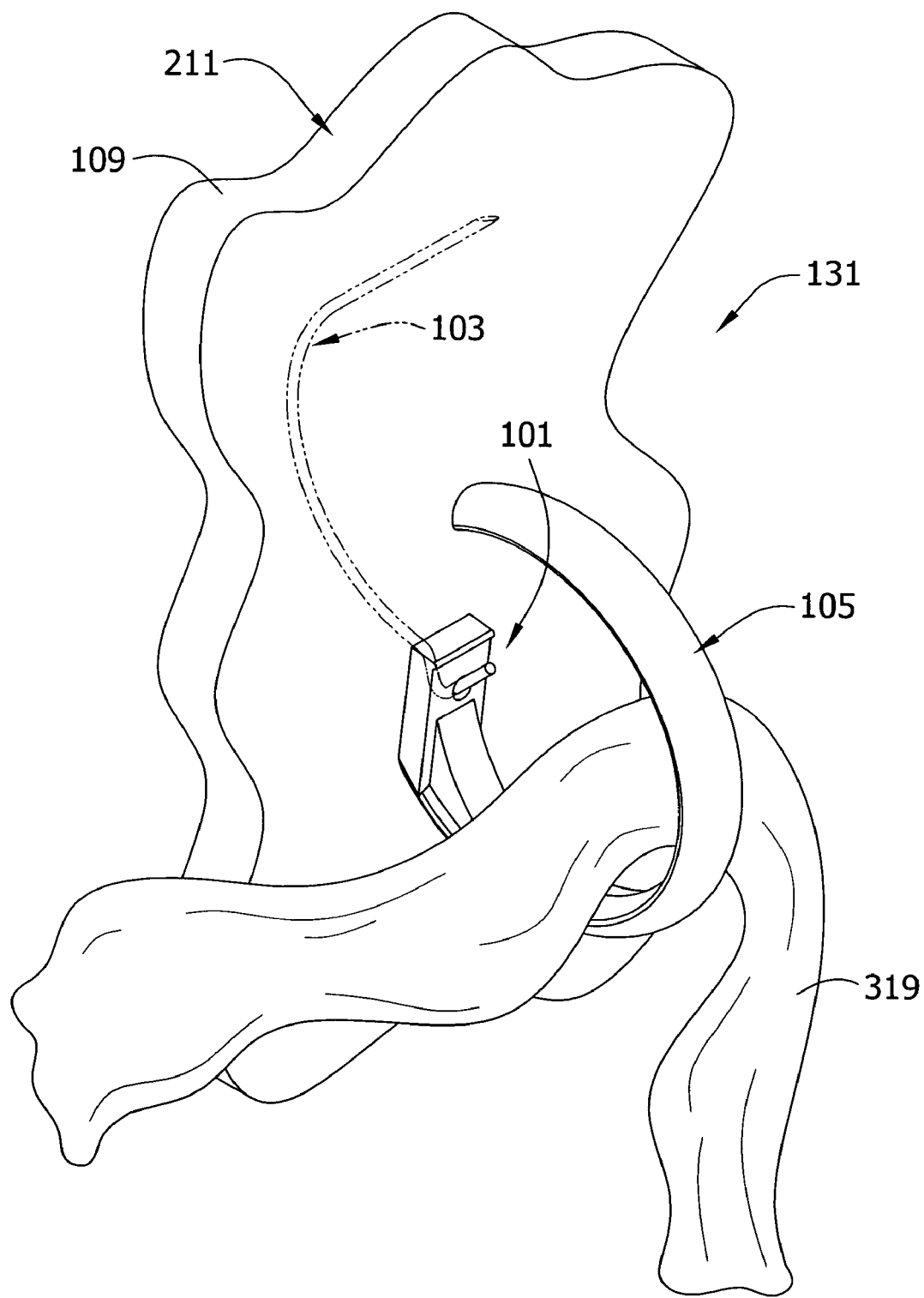
FIG. 14 is a perspective view of the mounting installation shown holding a flexible material.

The wall and ceiling mounted installations 131, 131' are suitable for holding other objects, including flexible objects such as fabric 319 as shown in FIG. 14.

Figure 15:
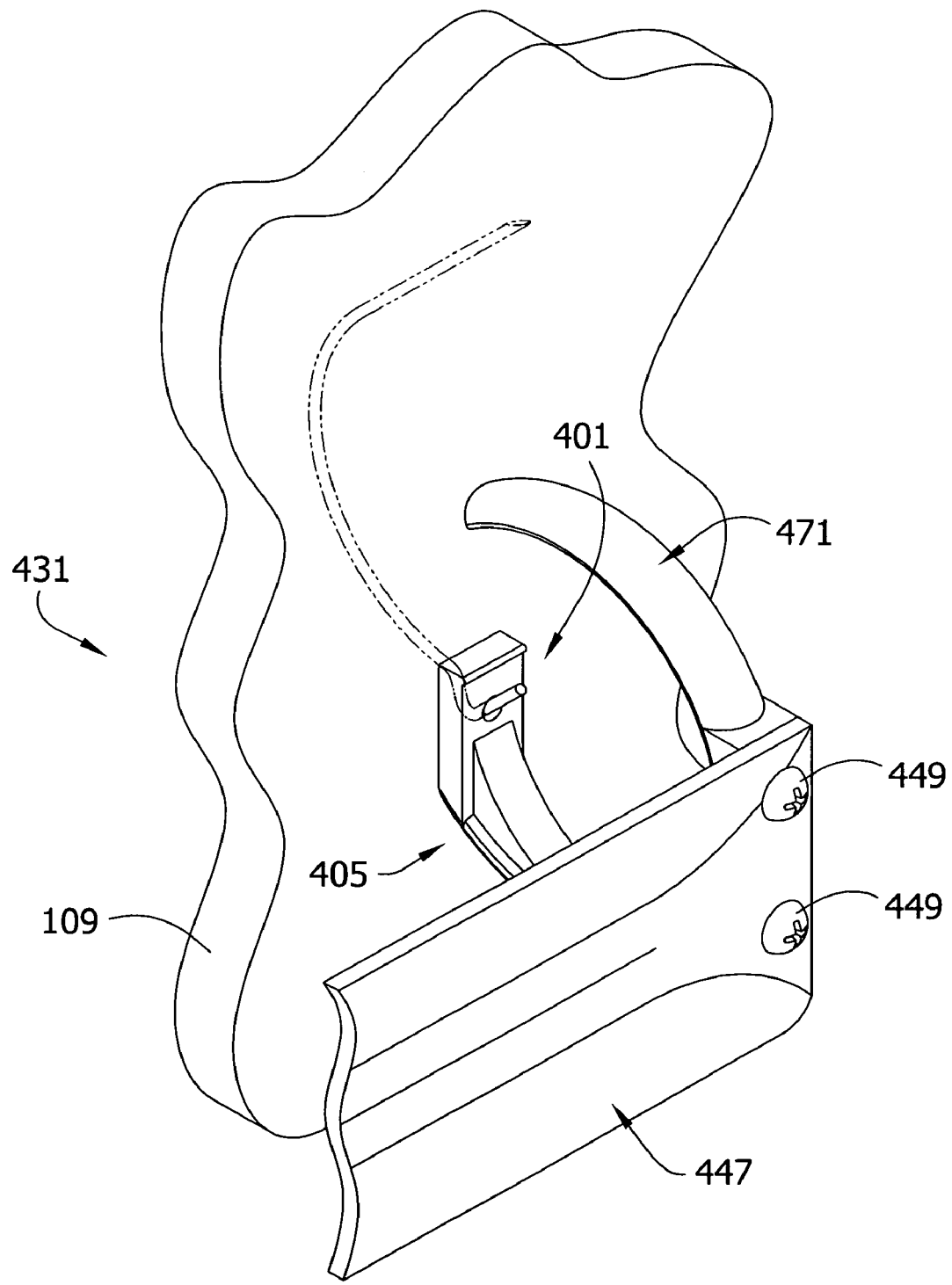
FIG. 15 is a perspective view of a second embodiment of a drywall mounting installation.
Figure 16:
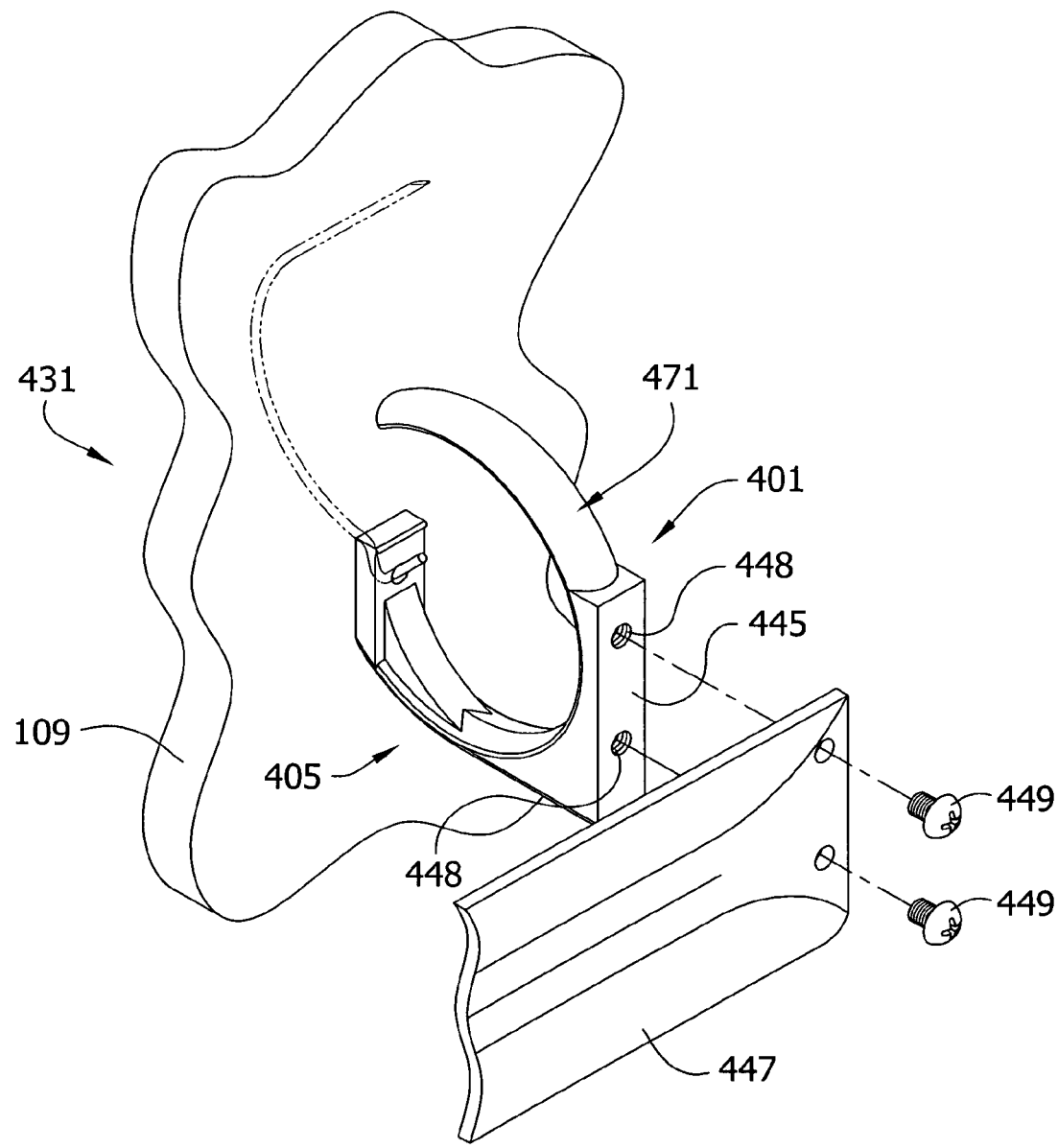
FIG. 16 is a partially exploded perspective view of the second embodiment of the drywall mounting installation.

A second embodiment of a wall mounting assembly 401 and installation 431 is depicted in FIGS. 15 and 16. This embodiment is substantially the same as the mounting assembly 101 and installation 131 described above except as noted. One difference between the assembly/installation 401, 431 shown in FIGS. 15 and 16 and the assembly/installation 101, 131 discussed above is that the arm 471 of the object holder 405 has a mounting surface 445 for securing a decorative item (e.g., a decorative panel 447) to the object holder. The mounting surface 445 of the embodiment shown in the drawings is a substantially planar surface on the second arm portion 481. The mounting surface 445 is oriented to face away from the drywall panel 109. Threaded bores 448 for receiving screws 449 used to fasten the decorative 447 item to the object holder 405 can optionally be provided in the mounting surface as shown in FIG. 16. Other fasteners could also be used to secure the decorative object to the object holder. Further, the object holder 405 can hold the decorative object 447 and another object (e.g. curtain rod—not shown in FIGS. 15 and 16) at the same time. The wall mounting assembly 401 can be installed on a wall to form a wall mounted installation 431, as shown in the drawings, or a ceiling to form a ceiling mounted installation (not shown).

Whereas the present invention has been specifically described at times, one skilled in the art will recognize that various modifications of the elements of the present mounting fixture may be employed without departing from the scope of the invention. For example, the object holder may be substituted with a continuous ring, or other completely closed loop, if desired for a particular application. It is further noted that in as much as the object holder is releasably held by the hook of the hook element of the present mounting fixture, a flexible item or rod may be threaded into holder while the holdre is removed from the hook and thereafter the holder may be affixed to the hook, thereby contributing flexibility to the use of the present invention.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An assembly for mounting an object on a wall or ceiling panel having a front side and a back side opposite the front side, the assembly comprising:

a wire hook configured so that it can be received in an opening extending through the panel from the front side to the back side so that only a relatively short hook portion extends from the front side of the panel, while a relatively longer segment of the wire hook at an opposite end thereof extends from the opening at the back side of the panel to engage the back side of the panel at a location spaced from said opening; and an object holder for holding the object, the object holder having a mounting portion defining a bore for receiving the relatively short hook portion of the wire hook, the object holder comprising an arm extending from the mounting portion and defining a support surface for supporting the object, wherein the mounting portion comprises a substantially planar panel-facing surface that faces the panel when the wire hook is installed in the panel and the object holder is mounted thereon, and the arm comprises a substantially circular ring portion extending from an end of the substantially planar panel-facing surface.

2. An assembly as set forth in claim 1, wherein the arm extends from the mounting portion to a location that is spaced no more than about 0.75 inches from a plane containing the panel-facing surface.

3. An assembly as set forth in claim 1, wherein the arm is connected to the mounting portion at a location that is offset from the bore a direction parallel to a plane containing the panel-facing surface.

4. An assembly as set forth in claim 1, wherein the mounting portion is a mounting block having a thickness in a direction substantially perpendicular to said panel-facing surface that is in the range of about 0.15 inches to about 0.75 inches.

5. An assembly as set forth in claim 1, wherein the arm partially encloses an area, the arm being sized and shaped to receive a rod having a diameter of at least about 0.75 inches in said partially enclosed area.

6. An assembly as set forth in claim 1, wherein the assembly is able to hold at least about 25 pounds of weight.

7. An assembly as set forth in claim 6, wherein the assembly is able to hold about 50 pounds of weight.

8. An assembly as set forth in claim 1, wherein the arm of the object holder comprises a mounting surface for mounting an object on the object holder.

9. An assembly as set forth in claim 8, wherein the mounting surface of the arm comprises a substantially planar surface facing a direction that is generally opposite a direction faced by the panel-facing surface of the mounting portion of the object holder.

10. An assembly as set forth in claim 1, wherein the bore comprises a substantially cylindrical portion that limits pivotal movement of the wire hook relative to the object holder when a portion of the wire hook is received in the bore.

11. An assembly as set forth in claim 10, wherein the arm of the object holder extends to an end opposite the mounting portion at a location that is no more than about 0.75 inches from a plane containing the panel-facing surface.

12. An assembly as set forth in claim 11, wherein the arm partially encloses an area, the arm being sized and shaped to receive a rod having a diameter of at least about 0.75 inches in said partially enclosed area.

13. An assembly as set forth in claim 1, wherein the panel is a drywall panel.

14. A mounting installation comprising:
   a panel having a front side and a back side opposite the front side, the panel having an opening therein extending between the front and back sides thereof;
   a wire hook received in the opening, the wire hook comprising a relatively short hook portion extending from the front side of the panel and a relatively longer segment at an end of the wire hook opposite the relatively short hook portion, the relatively longer segment extending from the opening at the back side of the panel to engage the back side of the panel at a location spaced from said opening; and
   an object holder for holding an object, the object holder having a mounting portion defining a bore for receiving the relatively short hook portion of the wire hook, the object holder comprising an arm extending from the mounting portion and defining a support surface for supporting the object,
   wherein the mounting portion comprises a substantially planar panel-facing surface that faces the panel and the arm comprises a substantially circular ring portion extending from an end of the substantially planar panel-facing surface.

15. A mounting installation as set forth in claim 14, wherein the panel has a substantially vertical orientation, the relatively longer segment of the wire hook engaging the back side of the panel at a location that is generally above said opening.

16. A mounting installation as set forth in claim 15, wherein the object holder is configured so that the arm extends from the mounting portion at an elevation lower than the elevation of the hook.

17. A mounting installation as set forth in claim 16, wherein the bore and hook are configured so that separation of the hook from the bore requires rotation of the object holder relative to the wire hook.

18. A mounting installation as set forth in claim 14, wherein the object holder is adapted to hold a curtain rod.

19. A mounting installation as set forth in claim 14, wherein the bore and hook are configured so that separation of the hook from the bore requires rotation of the object holder relative to the wire hook.

20. A mounting installation as set forth in claim 14, wherein an end of the arm opposite the mounting portion of the object holder is no more than about 0.75 inches away from a plane containing the panel-facing surface.

21. A mounting installation as set forth in claim 14, wherein the arm is a partial ring.

22. A mounting installation as set forth in claim 14, wherein the panel has a substantially horizontal orientation.

23. A mounting installation as set forth in claim 14, wherein the arm comprises a mounting surface for attaching an object to the object holder, the mounting surface being a generally flat surface facing away from the panel.

24. A mounting installation as set forth in claim 14, wherein the panel is a sheet of drywall.

* * * * *